US006357254B1

(12) United States Patent
Xia

(10) Patent No.: US 6,357,254 B1
(45) Date of Patent: Mar. 19, 2002

(54) COMPACT ABSORPTION CHILLER AND SOLUTION FLOW SCHEME THEREFOR

(75) Inventor: Lunxi Peter Xia, La Crescent, MN (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/607,601

(22) Filed: Jun. 30, 2000

(51) Int. Cl.[7] ............................................... F25B 15/00
(52) U.S. Cl. .......................................... 62/476; 62/141
(58) Field of Search ........................... 62/476, 141, 105, 62/148, 483, 485, 489

(56) References Cited

U.S. PATENT DOCUMENTS

| | | | |
|---|---|---|---|
| 3,266,266 A | | 8/1966 | Reid, Jr. |
| 3,590,593 A | * | 7/1971 | Miner ....................... 62/148 X |
| 4,454,726 A | | 6/1984 | Hibino et al. |
| 4,475,361 A | * | 10/1984 | Alefeld ......................... 62/476 |
| 5,177,979 A | * | 1/1993 | Gianfrancesco ........... 62/476 X |
| 5,259,205 A | | 11/1993 | Takahata et al. |
| 5,295,371 A | * | 3/1994 | Oonou et al. ................. 62/476 |
| 5,592,825 A | | 1/1997 | Inoue |
| 5,813,241 A | | 9/1998 | Sibik et al. |
| RE36,283 E | | 8/1999 | Rockenfeller et al. |
| 5,946,937 A | | 9/1999 | Kujak |
| 6,067,807 A | | 5/2000 | Reimann |

FOREIGN PATENT DOCUMENTS

JP          04064871 A   *   2/1992

* cited by examiner

Primary Examiner—Henry Bennett
Assistant Examiner—Chen-Wen Jiang
(74) Attorney, Agent, or Firm—William J. Beres; William O'Driscoll

(57) ABSTRACT

An absorption chiller includes a vertically split absorber section the upper portion of which is a high temperature absorber and the lower portion of which is a low temperature absorber. Weak solution is pumped in parallel from the absorber to both a low temperature generator and a high temperature generator. The low temperature generator is disposed vertically above the high temperature generator. Concentrated solution flows, in parallel, from the low temperature generator to the low temperature absorber and from the high temperature generator to the high temperature absorber. The flow of concentrated solution from the low temperature generator to the low temperature absorber is as a result of the elevation of the low temperature generator above the low temperature absorber while the flow of concentrated solution from the high temperature generator to the vertically elevated high temperature absorber is as a result of the pressure differential between the high temperature generator and the high temperature absorber.

49 Claims, 4 Drawing Sheets

COMPACT ABSORPTION CHILLER AND SOLUTION FLOW SCHEME THEREFOR

BACKGROUND OF THE INVENTION

The present invention relates to liquid chillers of the absorption type. More particularly, the present invention relates to a compact absorption chiller and a solution flow scheme therefor.

Absorption chillers are machines that by the use of chemical properties and reactions and pressure differentials caused thereby (among other things) provide a cooling effect that is typically employed to chill a liquid such as water. Absorption chillers are to be distinguished from so-called "electric chillers" which likewise produce chilled liquid but employ a compressor and a vapor compression process for purposes of chilling the liquid. The chilled liquid, in the case of both absorption and electric chillers, is most often used in the comfort conditioning of buildings or in manufacturing or industrial process applications.

Absorption chillers are often relatively very large and bulky pieces of equipment, weighing tens of thousands of pounds and occupying many hundreds if not thousands of cubic feet of space. Such chillers very often must be shipped internationally and to locations that can be tremendously difficult to access. Further, because absorption chillers have historically been relatively larger than electric chiller's of the same capacity, absorption chillers have heretofore not generally been capable of being employed as direct replacements for electric chillers of the same capacity, most often due to space and/or access constraints associated with the location in which the electric chiller which is to be replaced is located.

One relatively recent attempt to address absorption chiller size issues can be found in the teaching of U.S. Pat. No. 5,259,205. That patent describes a modularized arrangement for an absorption chiller in which certain chiller elements can be horizontally or vertically stacked. The Background of the Invention portion of the '205 patent accurately reflects and describes historical problems associated with absorption chillers in its reference to the fact that such machines, particularly those of "large-capacity", are often manufactured, charged with an absorbent and refrigerant, vacuum tested and factory test run to ensure the leak-tightness and satisfactory operation of the unit prior to shipment to their location of use.

The size of many such machines, however, often requires that the machine be cut or disassembled into component parts for shipment and be reassembled at the site of use. That process "breaks" system integrity, can require significant amounts of welding in the field, often in difficult to access locations, and can be extremely detrimental to the cost, reliability, longevity and efficient operation of such units which can be contaminated in the process and which rely on vacuum tightness to properly function.

A modularized absorption chiller in the nature of the one of the '205 patent is but one example of absorption chiller packaging for purposes of addressing the problems associated with the transport and handling of such chillers as well as an example of a solution flow scheme that is employed in conjunction with such a packaging concept to meet the requirements of the design. However, the need very clearly continues to exist for a still more compact design for an absorption chiller and a solution flow scheme therefor that is efficient and is capable of shipment throughout the world, preferably in commercially available, standardized shipping containers, as a non-modularized, pre-assembled, fully-charged, vacuum tested and operationally tested unit, and which need not be disassembled for shipment, even in relatively large chiller sizes/capacities.

SUMMARY OF THE INVENTION

It is an object of the present invention to provide a compact design for an absorption chiller which is applicable across a large range of chiller capacities.

It is another object of the present invention to provide an absorption chiller that employs a solution flow scheme that facilitates the compact packaging of an absorption chiller's constituent components.

It is another object of the present invention to provide an absorption chiller in which, by the disposition of the low temperature generator vertically above the high temperature generator and by the use of a vertically split absorber/evaporator combination, overall chiller width is significantly reduced, even in chillers of relatively large capacity.

It is another object of the present invention to provide an absorption chiller design that is applicable across a relatively large range of capacities yet which is capable of fitting and being shipped, as a unit and without disassembly, within standard, commercially available shipping containers, irrespective of a particular capacity size within such range.

It is an additional object of the present invention to provide a design for an absorption chiller that is capable of being produced in capacities ranging up to at least 800 refrigeration tons that need not be disassembled or broken down for shipment in commercially available, standardized shipping containers.

It is a further object of the present invention to provide a direct-fired absorption chiller which, by the disposition of its constituent components and the solution flow scheme employed therewith, employs only a single pump for causing solution flow through the chiller.

It is another object of the present invention to provide an absorption chiller in which, by the arrangement of the constituent components thereof, gravity, elevational differences and pressure are employed to cause solution flow between certain ones of the chiller components with the result that chiller operation is achieved without the use of a booster pump.

It is a still another object of the present invention to provide a design for an absorption chiller and a solution flow scheme therefor which permits such chillers to be produced and shipped, without disassembly, in physical sizes that allow them to be used as replacements for electric chillers of the same capacity, even where such capacities extend to the 800 refrigeration ton capacity range.

It is a still further object of the present invention to provide for an absorber/evaporator arrangement in an absorption chiller which, by the reduction of vapor flow velocity/pressure drop between the chiller's evaporator and absorber components, increases the heat transfer effectiveness of the chiller's heat exchanger tube bundles and, as a result, overall chiller efficiency.

It is an additional object of the present invention to employ counterflow heat exchange relationships between cooling water and solution flow as well as the parallel and unmixed flow of concentrated solution at different temperatures to vertically split absorbers in an absorption chiller to enhance the efficiency of the chiller, to allow such chiller to function with a single solution pump, and without a booster pump, and to permit such chiller to physically fit within standardized shipping containers without the need to breakdown or disassemble the chiller for shipment, even in capacities as high as 800 refrigeration tons.

These and other objects of the present invention, which will be apparent when the following Description of the Preferred Embodiment and attached Drawing Figures are given consideration, are accomplished in an absorption chiller which employs vertically split and arranged high and low temperature absorber sections, together with counterpart vertically split evaporator sections, as well as a low temperature generator that is disposed vertically above the low temperature absorber and a high temperature generator disposed vertically below the high temperature absorber. Solution flow from the low temperature generator to the low temperature absorber is as a result of gravity and the elevational difference between those components. Solution flow from the high temperature generator to the high temperature absorber, which parallels the flow of the somewhat lower temperature concentrated solution from the low temperature generator to the low temperature absorber, is as a result of the pressure which is developed in the high temperature generator. The pressure in the high temperature generator is sufficient to drive the relatively higher temperature concentrated solution vertically upward and into the vertically elevated high temperature absorber. Because the high temperature absorber is elevated above the low temperature absorber, gravity is employed to deliver solution from the high temperature absorber to the low temperature absorber where the solutions flowing through those respective absorber sections mix and collect for use downstream in the chiller system.

By the employment of vertically split and arranged absorbers and associated split evaporator sections, the width of the absorber component of the chiller and the chiller overall is reduced sufficiently to permit it to be shipped as a unit in standardized shipping containers, without the need to disassemble or breakdown the chiller for shipment, even in the case of chillers of relatively very large capacity. As a result of the use of gravity and pressure to move solution between certain of the constituent components of the chiller, only one solution pump and no booster pump is required to achieve solution flow. Further, by the parallel and unmixed delivery and distribution of concentrated solution to the two absorber sections, where one of the flow streams of concentrated solution is hotter than the other, and by the counterflow of the chiller's cooling medium through the chiller's absorber section, maximum use is made of differential temperature, referred to as "temperature glide", within the chiller to enhance heat exchange and the overall efficiency of the chiller.

DESCRIPTION OF THE PREFERRED EMBODIMENT

Figure 1:
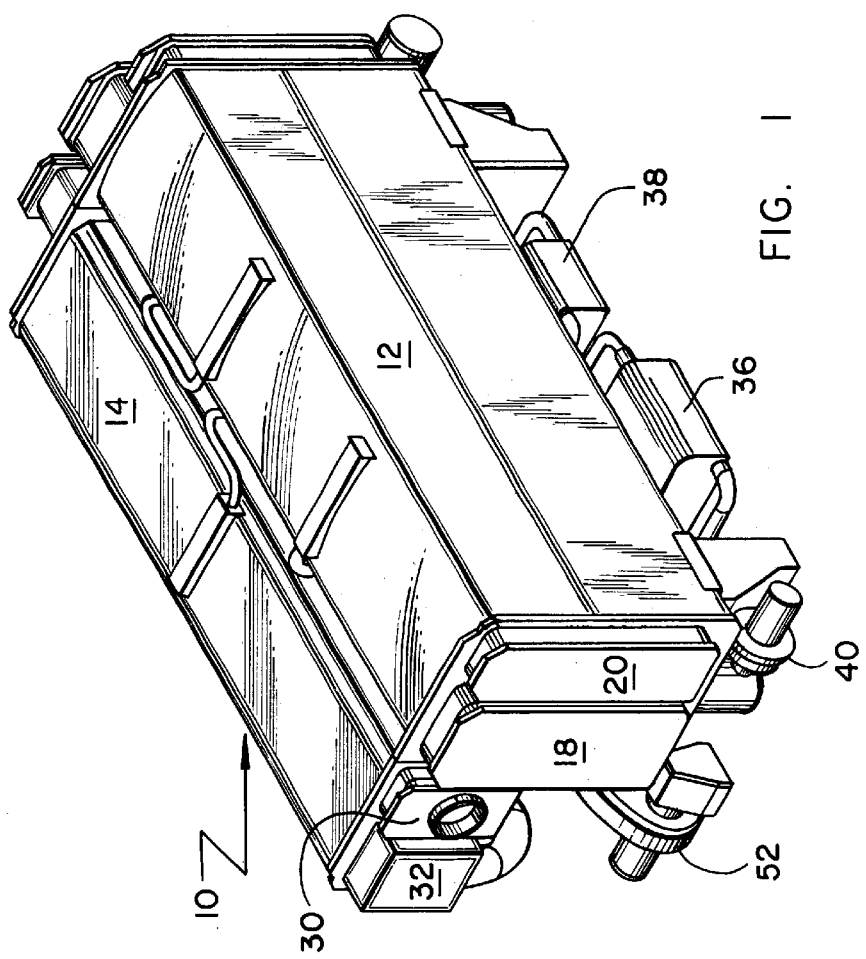
FIG. 1 is a perspective view of the absorption chiller of the present invention.
Figure 2:
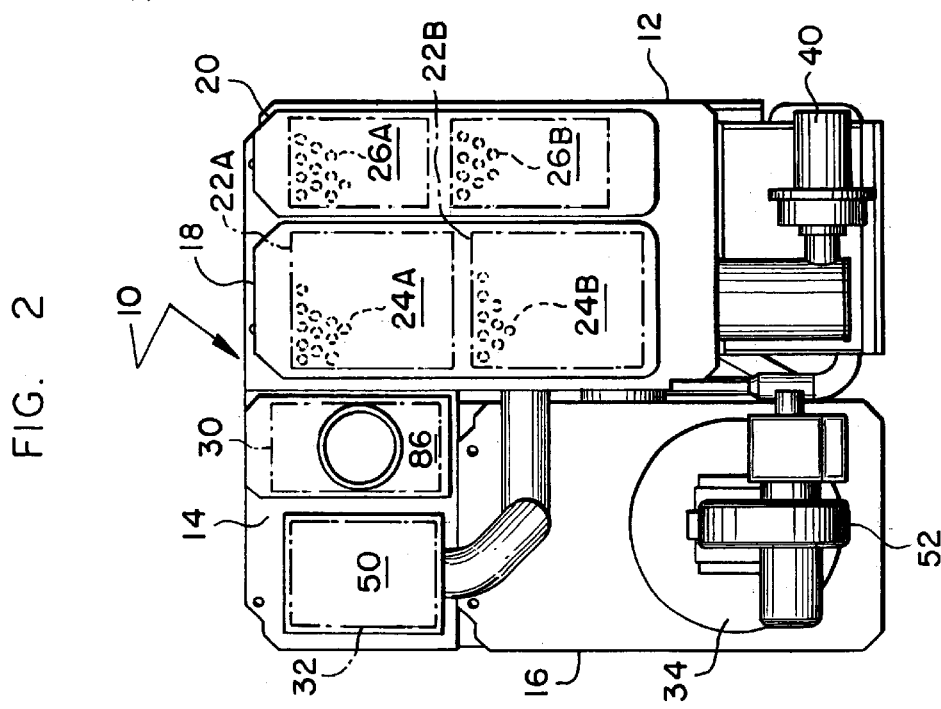
FIG. 2 is an end view of the absorption chiller of the present invention.
Figure 3:
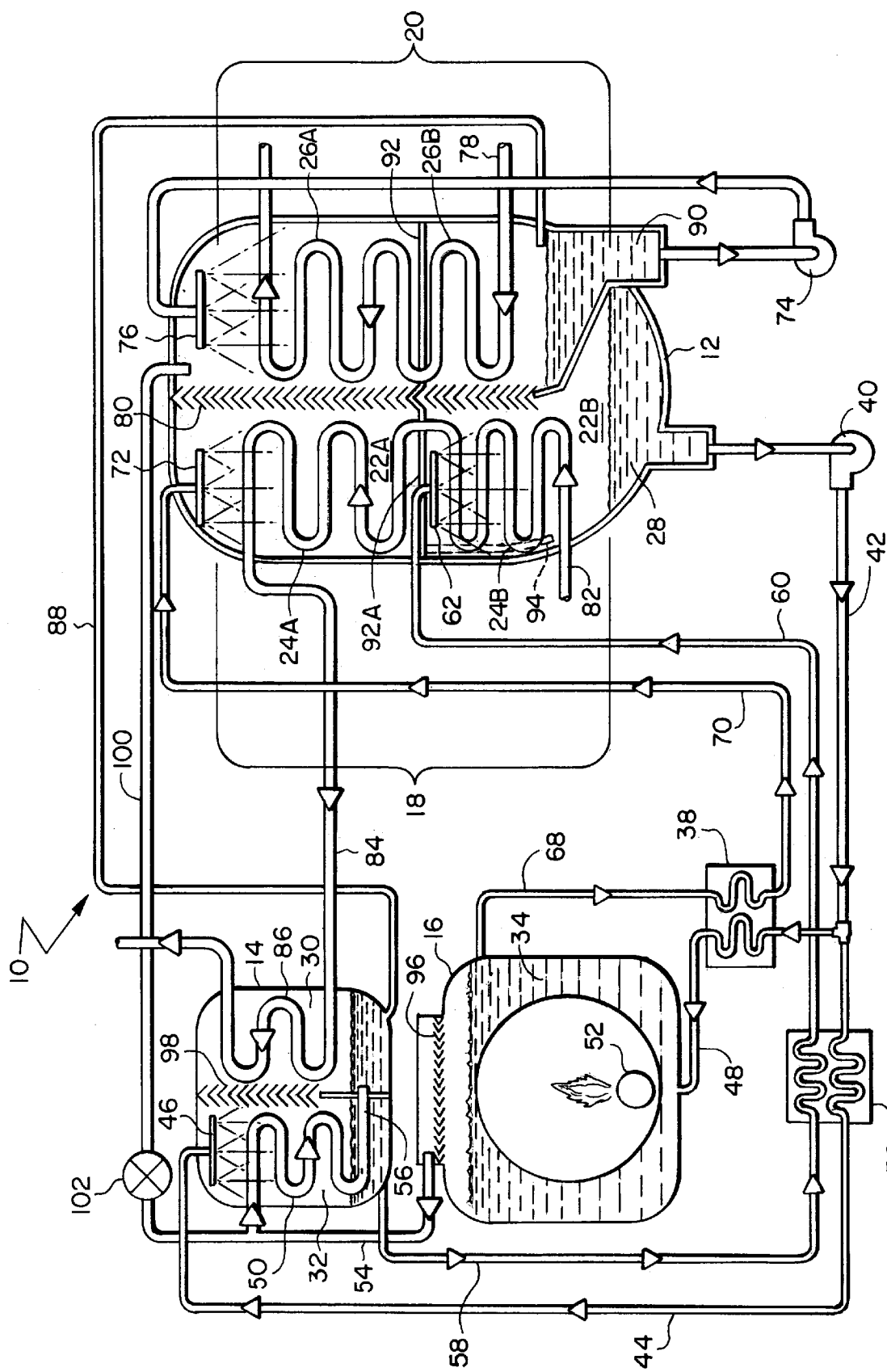
FIG. 3 is a schematic view of the absorption chiller of the present invention illustrating the preferred solution flow scheme and relative disposition of the constituent components thereof.

Referring to FIGS. 1, 2 and 3, chiller 10 of the present invention is comprised of a first shell 12, a second shell 14 and a third shell 16.

First shell 12 houses absorber 18 and evaporator 20. Evaporator 20 is horizontally adjacent absorber 18 within shell 12. Absorber 18 is comprised of a high temperature absorber 22A and a low temperature absorber 22B. High temperature absorber 22A includes a tube bundle 24A while low temperature absorber 22B includes a tube bundle 24B.

Evaporator 20 includes first and second tube bundles 26A and 26B respectively. As will further be described, dilute or so-called "weak" solution, consisting of a mixture of system absorbent (most often lithium bromide) and system refrigerant (most often water) will be found in pool 28 at the bottom of absorber 18.

Second shell 14 houses condenser 30 and low temperature generator 32. Third shell 16 is generally vertically aligned with and is preferably disposed below shell 14 and houses the chiller's high temperature generator 34.

Disposed generally below shells 12 and 14 are low temperature heat exchanger 36 and high temperature heat exchanger 38. Because second shell 14 is, in the preferred embodiment, disposed vertically in line with third shell 16 and because absorber 18 and evaporator 20 are each vertically split, with high temperature absorber 22A, its tube bundle 24A and first evaporator tube bundle 26A being disposed vertically above low temperature absorber 22B, its tube bundle 24B and second evaporator tube bundle 26B respectively, the width of chiller 10 is, as will more thoroughly be described, capable of being reduced so much so that chiller 10 can be shipped, even in relatively very large refrigeration capacities, in standard-width shipping containers as a fully assembled and factory tested unit, as opposed to being broken down for purposes of shipment.

Referring in particular now to FIG. 3, the preferred solution flow arrangement for chiller 10, which of necessity must accommodate the chiller's split absorber/evaporator arrangement, is described. Commencing at solution pump 40, weak solution is pumped from pool 28 in the bottom of absorber 18 in shell 12, through piping 42 to both low temperature heat exchanger 36 and high temperature heat exchanger 38. It is then delivered in parallel through piping 44 from low temperature heat exchanger 36 to drip pan 46 in low temperature generator 32 and through piping 48 from high temperature heat exchanger 38 into high temperature generator 34. As a result of the heat exchange processes that occur within low temperature generator 32 and high temperature generator 34, the weak solution pumped to those locations becomes concentrated by the boiling of system refrigerant thereoutof.

At the outset, it is to be noted that the use of drip pan 46 in low temperature generator 32 is preferable, as opposed to the use of a pressurized spray tree, for the reason that distribution of the weak solution over tube bundle 50 of the low temperature generator is much more uniform and even across the length and width of the tube bundle. That allows for better and more extensive contact between the distributed solution and the tubes of the underlying tube bundle which, in turn, enhances the heat exchange process that occurs in the low temperature generator. A further advantage in the use of a drip pan as opposed to a spray tree is that in order for spray trees to be effective, they will typically be required to be elevated at some vertical distance above the underlying tube bundle which adds to the height associated with the spray tree/tube bundle combination. Still further, individual nozzles are employed by spray trees through which the pressurized fluid to be distributed flows. Such nozzles are prone to clogging and when clogged essentially eliminate the flow of fluid onto a portion of the underlying tube bundle. Such clogging and the failure to wet underlying tube surfaces is detrimental to the heat exchange process and can significantly and adversely affect chiller efficiency. For the reasons set forth immediately above, distribution of solution and refrigerant in others of the chiller's components is accomplished by the use of drip pans as will subsequently be described.

In the case of high temperature generator 34, which will preferably be a direct-fired generator, but which can be fired by steam or another source of heat, weak solution delivered thereinto from high temperature heat exchanger 38 is heated to relatively very hot temperatures by burner 52. This results in the boiling of refrigerant out of the weak solution and the delivery of relatively hot refrigerant vapor to the upper portion thereof.

The relatively hot refrigerant vapor produced in high temperature generator 34 flows through piping 54 into tube bundle 50 of low temperature generator 32 where it heats the weak solution that is distributed onto tube bundle 50 by drip pan 46. That, in turn, heats and causes vaporization of the refrigerant in the weak solution that is dripped onto tube bundle 50 from pan 46 but also causes refrigerant vapor flowing within the tubes of tube bundle 50 to condense. The refrigerant vapor generated exterior of the tubes in tube bundle 50 in low temperature generator 32 makes its way into condenser 30 where it condenses, mixes with refrigerant delivered thereinto via piping 56 from tube bundle 50 and is returned to evaporator 20 as will further be described. In the case of both the low and high temperature generators, the boiling of refrigerant out of the weak solution delivered thereinto results, as mentioned, in the concentration of the system solution.

Concentrated solution flows by force of gravity and as a result of the elevation of the low temperature generator through piping 58 from low temperature generator 32 back to low temperature heat exchanger 36. There, some of the heat in the concentrated solution is rejected to and preheats the weak solution that flows in a counterflow relationship through the low temperature heat exchanger to the low temperature generator. The concentrated solution then flows out of low temperature heat exchanger 36 into piping 60 and is delivered to drip pan 62 of low temperature absorber 22B.

It is important to note that the flow of concentrated solution from low temperature generator 32 to low temperature absorber 24 occurs without the use of an additional solution pump and is as a result of gravity and head associated with the elevation of low temperature generator 32 above low temperature absorber 22B. It is also of significance that, as is the case in low temperature generator 32, a drip pan is preferably employed in low temperature absorber 24 to enhance the distribution of concentrated solution onto its underlying tube bundle 24B. Once again, though a spray tree or some other form of liquid distribution could be used and falls within the scope of the present invention, the use of a drip pan is preferred for the reason that liquid distribution in relatively low energy form onto an underlying tube bundle is more uniformly accomplished, less vertical space is taken up by the drip pan/tube bundle combination and no nozzles, which can become clogged, are employed. As a result, the heat transfer that occurs between the distributed solution and the tubes of the tube bundle onto which it is distributed is enhanced, as is overall chiller efficiency.

Concentrated solution flows out of high temperature generator 34 through piping 68 to high temperature heat exchanger 38 where, in a manner similar to the heat exchange that occurs in low temperature heat exchanger 36, the concentrated solution flows in a counterflow heat exchange relationship with and preheats the relatively cooler weak solution flowing therethrough enroute to the high temperature generator. The concentrated solution flows out of high temperature heat exchanger 38 into and through piping 70 and is delivered to drip pan 72 in high temperature absorber 22A. Once again, the use of a drip pan in the location as opposed to a spray tree is preferable for the reasons noted above.

On the refrigerant side of the chiller, refrigerant pump 74 pumps the system refrigerant from the bottom of the evaporator 20 to drip pan 76 at the top thereof. In order for the chiller to carry out its cooling function, the medium which has been heated by and carries heat from the heat load which is the purpose of chiller 10 to cool is delivered to the chiller's evaporator through piping 78. This medium, which like the system refrigerant will most typically be water, flows into lower tube bundle 26B of the evaporator 20 then upward, into and through upper tube bundle 26A. The flow of this medium is preferably counter to the downward flow of system refrigerant through the evaporator.

As a result of the rejection of heat from the heat load-carrying medium which flows through evaporator tube bundles 26A and 26B to the system refrigerant, the medium is chilled and is delivered out of shell 12 back to the heat load which requires cooling. At the same time, refrigerant flowing downward through the evaporator exterior of the tubes of tube bundles 26A and 26B vaporizes due to the rejection of heat to it from the medium flowing interior of those tubes. The vaporized refrigerant flows through vapor separator 80 from evaporator 20 into absorber 18 due to the slight pressure differential that will exist therebetween.

Vapor separator 80 is configured to permit the passage of refrigerant vapor out of evaporator 20 into absorber 18 but to prevent the carryover of liquid or liquid droplets from evaporator 20 into absorber 18. At the same time, vapor separator 80 also serves to prevent the entry of salt, which may form in absorber 18, into evaporator 20 and thereby prevents contamination of the system refrigerant. Still other advantages associated with vapor separator 80 will be discussed below.

The relatively warm refrigerant vapor that makes its way into absorber 18 through vapor separator 80 from evaporator 20 mixes with and is absorbed into the concentrated solution that is dripped onto the tops of tube bundle 24A of high temperature absorber 22A and tube bundle 24B of low temperature absorber 22B by drip pans 72 and 62 respectively. At the same time, cooling water is delivered through piping 82 into the tubes of tube bundle 24B of low temperature absorber 22B and flows upward in a counterflow heat exchange relationship with the system solution that flows downward through the absorber exterior of the tubes of the absorber tube bundles. Such cooling water flows from tube bundle 24B, through tube bundle 24A of and then out of shell 12 through piping 84 into tube bundle 86 of condenser 30. From there, the cooling water flows out of chiller 10.

The concentrated solution that flows downward through absorber 18 is diluted or "weakened" in the process of its downward flow as a result of its absorption of refrigerant vapor. The dilute or "weak" solutions from both the high temperature and low temperature absorber sections eventually makes its way to the bottom of absorber 18 in shell 12 where it forms the pool 28 of weak solution that is pumped to the low and high temperature generators 32 and 34 by solution pump 40.

System refrigerant that makes its way into in condenser 30, whether from within the tubes of tube bundle 50 of low temperature generator 32 via piping 56 or as a result of the condensing of system refrigerant exterior of the tubes in condenser tube bundle 86, is delivered to evaporator 20 through piping 88 by force of gravity, by the head that results from the elevational difference of the components and as a result of the slightly higher pressure that will typically exist in condenser 30. Such condensed refrigerant flows into the refrigerant pool 90 at the bottom of evaporator 20 from where it is recirculated to drip pan 76 at the top of the evaporator by refrigerant pump 74.

It is to be noted that a liquid re-distribution pan 92 is preferably made use of in shell 12 and is disposed generally above both tube bundle 24B of low temperature absorber 22B and lower tube bundle 26B of evaporator 20. Re-distribution pan 92, like pans 46, 62, 72 and 78 functions as a drip pan and operates to redirect, enhance and make more uniform the distribution of liquid across tube bundle 24B of low temperature absorber 24 and across tube bundle 26B in the lower portion of evaporator section 20.

As a result of temperature differences that do exist between high temperature absorber 22A and low temperature absorber 22B, the use of re-distribution pan 92, which does serve generally to separate shell 12 into upper and lower sections, results in the creation and maintenance of a slightly higher pressure in the high temperature absorber and upper portion of the evaporator as compared to the pressure which will be found to exist in the low temperature absorber and lower portion of the evaporator. Because this pressure differential exists, even though it is relatively small, liquid that does make its way into re-distribution pan 92 tends to flow and be distributed more evenly and consistently therethrough and across both the low temperature absorber and evaporator tube bundles. This further enhances the heat exchange processes that occur in shell 12 as well as the overall efficiency of the chiller.

All of distribution pans 46, 62, 72 and 78, as well as re-distribution pan 92 are relatively simple of construction, consisting generally of metal sheets defining a plurality of holes of predetermined size and location that open generally across the length and width of the tube bundle they overlie. As a result of this configuration, the flow of liquid therethrough and thereoutof is in low-energy form and is generally consistent in quantity and quality across the top of the overlain tube bundles.

It is to be noted that as an alternative to the flow of solution from high temperature absorber 22A into low temperature absorber 22B through the portion 92A of re-distribution pan 92 located in absorber 18, portion 92A of redistribution pan 92 could be made solid and could, in effect, function as a collection pan for solution that has flowed downward through high temperature absorber 22A. In that case, the solution making its way to the bottom of high temperature absorber 22A would be collected in portion 92A of pan 92 and would be delivered, such as through pipe 94, shown in phantom in FIG. 3, into pool 28 at the bottom of low temperature absorber 22B without interacting with tube bundle 24B of low temperature heat absorber 22B.

Other aspects of chiller 10 that are of note include the fact that a vapor separator 96 is employed in direct fired generator 34 as is the case in shell 14 where vapor separator 98 is disposed between low temperature generator 32 and condenser 30. In direct-fired generator 34, vapor separator 96 permits the flow of refrigerant vapor through piping 54 into tube bundle 50 of the low temperature generator but prevents the carryover of liquid out of the high temperature generator. Vapor separator 98 is disposed between low temperature absorber 32 and condenser 30 in third shell 14 for the same purpose.

Piping 100 and changeover valve 102 exist for the purpose of enabling chiller 10 to produce heated water when the heat load and/or temperature conditions call for heated as opposed to chilled water. Typically, changeover valve will be positioned to allow vapor flow through piping 100 only once a year when ambient conditions begin to call for heat on a regular basis.

There are several other aspects of chiller 10 that are of particular importance and give it significant advantages. Among those is the fact that its employment of split absorbers, which are vertically disposed with respect to each other, permits the flow of solution downward from the high temperature absorber section to the low temperature absorber section by gravity.

Further, the use of relatively tall and narrow, vertically split absorber tube bundles reduces vapor flow velocity/ pressure drop between the horizontally adjacent evaporator and absorber sections, increasing the efficiency of the heat exchange process that occur therein. In that regard, because the tube bundles of the vertically split absorber and evaporator sections are relatively tall and narrow, vapor separator 80 presents a relatively very large face surface. That surface constitutes the flow area through which vapor makes its way from the evaporator into the absorber.

Also, because the tube bundles are relatively tall and narrow, there is significantly less distance for the refrigerant vapor to travel from the evaporator and into the absorber in order to reach the more remote portions of the absorber tube bundles. The overall result is reduced vapor flow velocity and pressure drop through and across vapor separator 80 and increased heat transfer effectiveness which, once again, increases the efficiency of chiller 10.

Also of note with respect to the employment of vertically split absorbers is the employment of a separate concentrated solution distributor for each absorber section. As a result of the use of a dedicated distributor in each of the absorber sections and as a result of the delivery, in parallel, of concentrated solution to each distributor from a different source location and without the mixing thereof, concentrated solution from the high temperature generator, which will be at a relatively higher temperature and pressure, is capable of being driven upward to the distributor in the high temperature absorber while the concentrated solution from the low temperature generator is separately delivered to the distributor in the low temperature absorber by the force of gravity and as a result of the elevation difference between the low temperature generator and the physically lower low temperature absorber.

The separate delivery of relatively much warmer concentrated solution to one of the absorber sections, in this case the upper absorber section, together with the counterflow of coolant through the absorber tube bundles allows chiller 10 to take advantage of temperature glide, that is, to take advantage of the relatively large temperature differentials that are found in the chiller. By taking advantage of temperature glide, system efficiency is enhanced.

Further with respect to temperature glide, the various counterflow heat exchange relationships that have been noted and which occur throughout chiller 10 all seek to take advantage of available temperature differentials. Because of such counterflow relationships and because of the parallel delivery of concentrated solution to relatively narrow, tall vertically split absorber sections, the solution flow scheme within chiller 10 is very efficient yet permits chiller 10 to be of a compact size, even in relatively large capacities.

Still further, because of the parallel flow arrangement for concentrated solution and because of the relative elevational positioning of the high temperature generator, the low temperature generator, the high temperature absorber and the low temperature absorber, the need for more than one solution pump to pump concentrated solution within the chiller is, as has been noted, eliminated. Instead, pressure is relied upon to deliver concentrated solution to the vertically elevated high temperature absorber from the high temperature generator while gravity/elevation difference is relied upon to deliver concentrated solution to the vertically lower low temperature absorber from the low temperature generator.

Finally, because of the vertical alignment of shells 14 and 16 and because the high temperature absorber and low temperature absorber are split and positioned vertically, one above the other, as are associated portions of the evaporator, and because each tube bundle in shell 12 is relatively tall and narrow, the width of shell 12 and of chiller 10 overall is significantly reduced. Of particular note is the fact that the height to width ratio of shell 12 will generally be on the order of 1.5:1 or greater with that ratio being, in the preferred embodiment, somewhat higher for the evaporator and somewhat lower for the absorber. The narrowness of the chiller design, together with the solution flow scheme employed in the chiller permits chiller 10 to be built in capacities at least as high as 800 tons in widths, lengths and heights that permit it to fit in commercially available, standard shipping containers without the need to break the chiller down for shipping purposes. See, in that regard, FIGS. 4A, 4B and 4C which demonstrate the overall compactness, reduced width and height of chillers of the design of the present invention as compared to absorption chillers commercially available from the major manufacturers in the world market today in the same or similar capacities.

Figure 4A:
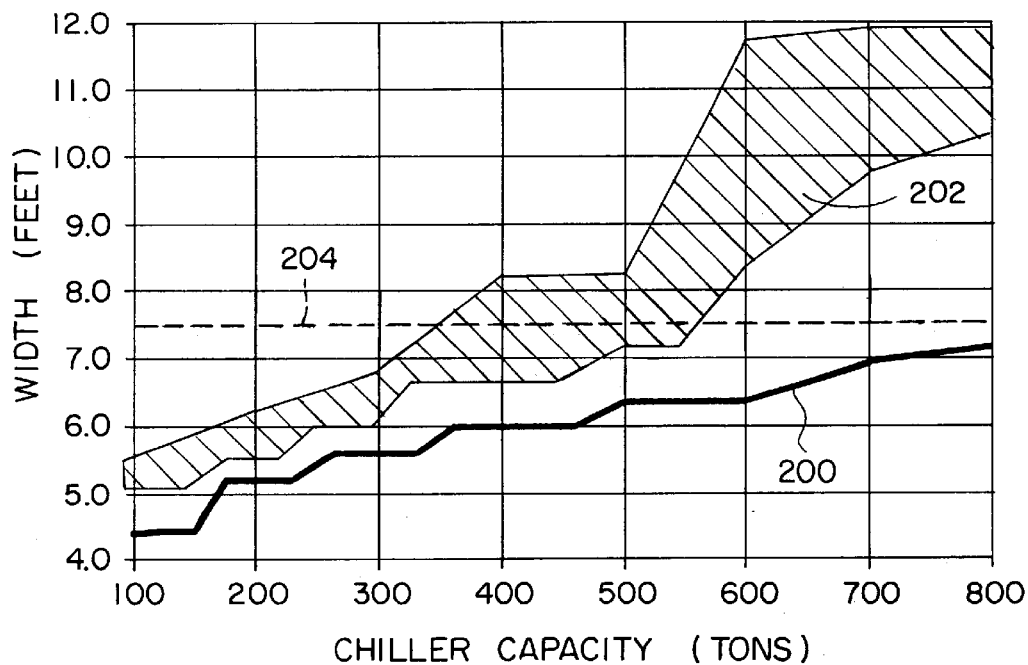
FIGS. 4a, 4b and 4c graphically illustrate unit width, height and overall footprint for the chiller of the present invention versus chillers of comparable capacity that are generally available on the world market today and demonstrate the relative compactness of the chiller of the present invention and its ability to be shipped in standardized shipping containers in capacities which are very significantly higher than are possible today.
Figure 4B:
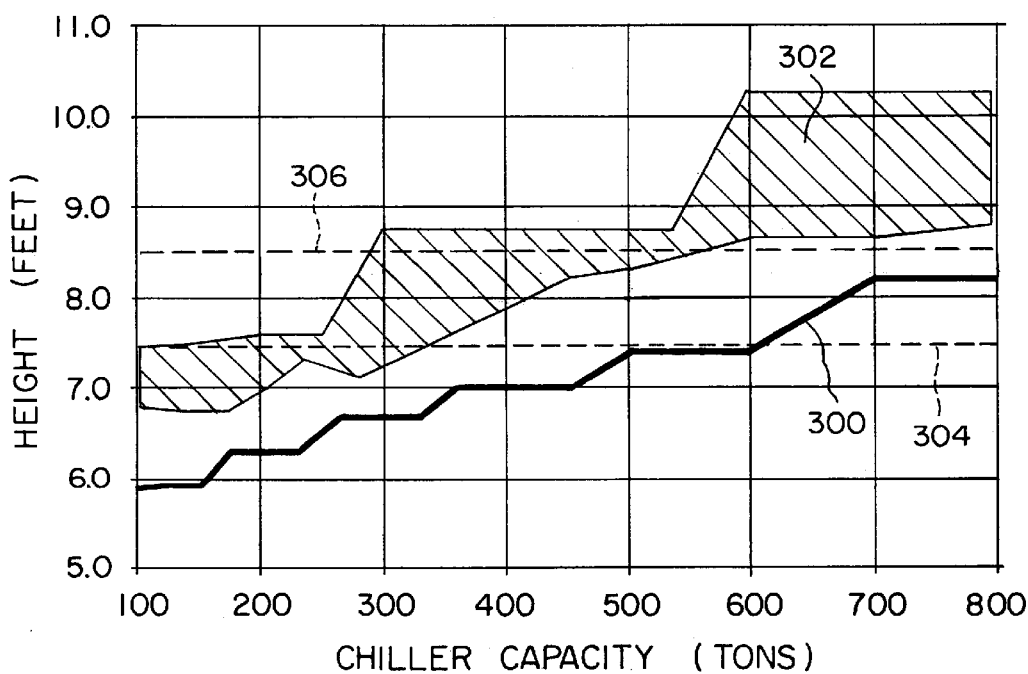
Figure 4C:
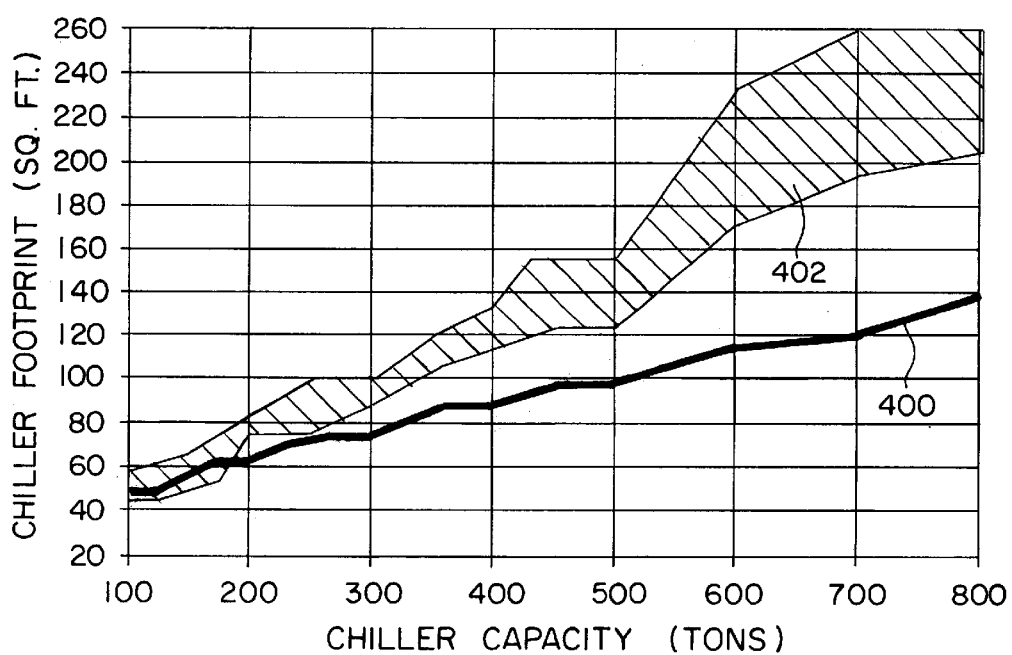

With respect to FIGS. 4A, 4B and 4C, solid lines 200, 300 and 400 respectively identify the width, height and footprint of chillers of the present invention versus their capacity. Cross hatched regions 202, 302 and 402 respectively represent the widths, heights and footprints of absorption chillers available from major manufacturers in the world market today. Finally, dashed lines 204 and 304 respectively indicate the width and height of standard, commercially available so-called "dry containers" whereas dashed line 306 in FIG. 4B identifies the height of so-called "high cube" standard, commercially available shipping containers. The width of standard dry containers is 90 inches while their height is 89.5 inches. The width of high cube containers is 92 inches while their height is 101.75 inches. As has been noted, the width is and height of chillers of the present invention is similar to or less than the widths and heights of electric chillers of similar capacities making the absorption chillers of the present invention candidates to be used as replacements for electric chillers of the same capacity.

As will be appreciated from FIGS. 4A, 4B and 4C, chillers of the present invention can be shipped in standardized shipping containers in capacities at least up to 800 tons whereas existing competitive chillers generally exceed standardized shipping container height and width restrictions at approximately 500 tons of capacity. The chiller's of the present invention therefore represent on the order of a 60% increase in the capacity of absorption chillers that can be shipped in standardized and commercially available shipping containers without disassembly and make such chillers available in capacities that cover the very large majority of applications for such chillers in the world today.

While the chiller of the present invention has been described in terms of a preferred embodiment and flow scheme, it will be appreciated by those skilled in the art that modifications to both thereof can be made and fall within the scope of the present invention.

What is claimed is:

1. An absorption chiller comprising:
   a high temperature generator;
   a low temperature generator;
   a condenser;
   an evaporator;
   a solution that includes an absorbent and a refrigerant;
   an absorber, said absorber including a high temperature absorber and a low temperature absorber, said low temperature absorber being disposed below both said high temperature absorber and said low temperature generator, a first portion of said solution flowing from said low temperature generator to and through said low temperature absorber and a second portion of said solution flowing from said high temperature generator to and through said high temperature absorber, the flow of said first solution portion from said low temperature generator to said low temperature absorber being assisted by the force of gravity and the flow of said second solution portion from said high temperature generator to said high temperature absorber being under the impetus of the pressure which exists in said high temperature generator.

2. The absorption chiller according to claim 1 wherein said first solution portion and said second solution portion combine and pool together at the bottom of said absorber after respectively flowing through said low temperature absorber and said high temperature absorber.

3. The absorption chiller according to claim 2 further comprising a solution pump, said solution pump pumping solution from said pool at the bottom of said absorber, in parallel, to both said high temperature generator and to said low temperature generator.

4. The absorption chiller according to claim 3 wherein said high temperature absorber includes a tube bundle and wherein said low temperature absorber includes a tube bundle and further comprising a first distributor and a second distributor, said first distributor being disposed vertically above the tube bundle of said high temperature absorber and said second distributor being disposed vertically above the tube bundle of said low temperature absorber, said first solution portion flowing from said low temperature generator into and out of said first distributor and onto said tube bundle of said low temperature absorber and said second solution portion flowing from said high temperature generator into and out of said second distributor and onto the tube bundle of said high temperature absorber.

5. The absorption chiller according to claim 4 wherein said low temperature generator is vertically aligned with and above said high temperature absorber.

6. The absorption chiller according to claim 4 further comprising a high temperature heat exchanger and a low temperature heat exchanger, the solution pumped by said solution pump from said pool at the bottom of said absorber to said low temperature generator flowing through said low temperature heat exchanger enroute to said low temperature generator and the solution pumped by said solution pump from said pool at the bottom of said absorber to said high temperature generator flowing through said high temperature heat exchanger enroute to said high temperature generator, said first solution portion flowing through said low temperature heat exchanger enroute from said low temperature generator to said low temperature absorber and said second solution portion flowing through said high temperature heat exchanger enroute from said high temperature generator to said high temperature absorber.

7. The absorption chiller according to claim 6 wherein the flow of said first solution portion through said low temperature heat exchanger is in a direction which is counter to the flow of solution that is pumped through said low temperature heat exchanger to said low temperature generator and wherein the flow of said second solution portion through said high temperature heat exchanger is in a direction which is counter to the flow of solution that is pumped through said high temperature heat exchanger to said high temperature generator, said first solution portion rejecting heat to the solution that is pumped through said low temperature heat exchanger and said second solution portion rejecting heat to the solution that is pumped through said high temperature heat exchanger.

8. The absorption chiller according to claim 4 further comprising a coolant that flows through said absorber, said coolant flowing first through the tube bundle of said low temperature absorber then through the tube bundle of said high temperature absorber.

9. The absorption chiller according to claim 8 wherein said condenser has a tube bundle, said coolant flowing from said high temperature absorber into and through the tube bundle of said condenser.

10. The absorption chiller according to claim 4 wherein said evaporator has an upper portion and a lower portion, the upper portion of said evaporator being disposed generally above the lower portion of said evaporator and horizontally adjacent the tube bundle of said high temperature absorber and the lower portion of said evaporator being disposed generally horizontally adjacent the tube bundle of said low temperature absorber.

11. The absorption chiller according to claim 10 wherein said upper portion of said evaporator includes a tube bundle and said lower portion of said evaporator includes a tube bundle and further comprising a re-distribution pan, a refrigerant distributor and a refrigerant pump, said refrigerant pump pumping liquid refrigerant from the bottom of said evaporator, into and through said refrigerant distributor, said refrigerant distributor being disposed above said tube bundle of said upper evaporator portion and distributing refrigerant thereonto, said re-distribution pan being disposed below said tube bundle of said high temperature absorber and below said tube bundle of said upper portion of said evaporator and above said tube bundle of said low temperature absorber and above said tube bundle of said lower portion of said evaporator, said re-distribution pan collecting and re-distributing said second solution portion, subsequent to the flow thereof through said tube bundle of said high temperature absorber, onto said tube bundle of said low temperature absorber and said re-distribution pan collecting and re-distributing refrigerant that has flowed through said tube bundle of said upper portion of said evaporator onto said tube bundle of said lower portion of evaporator.

12. The absorption chiller according to claim 4 wherein said second solution portion flows onto said tube bundle of said low temperature absorber subsequent to flowing onto and through said tube bundle of said high temperature absorber.

13. The absorption chiller according to claim 12 further comprising means for collecting said second solution portion, after it has flowed through said tube bundle of said high temperature absorber, and for redistributing it onto said tube bundle of said low temperature absorber.

14. The absorption chiller according to claim 13 wherein said means for collecting and redistributing said second solution portion comprises a re-distribution pan disposed generally below said tube bundle of said high temperature absorber and above said tube bundle of said low temperature absorber, said re-distribution pan defining a plurality of apertures through which said second solution portion flows onto said tube bundle of said low temperature absorber.

15. The absorption chiller according to claim 4 further comprising means for collecting said second solution portion, after it has flowed through said tube bundle of said high temperature absorber, and for directing said second solution portion into said pool at the bottom of said absorber, without the interaction of said second solution portion with the tube bundle of said low temperature absorber.

16. The absorption chiller according to claim 15 wherein said means for collecting comprises a generally solid pan disposed below the tube bundle of said high temperature absorber and above the tube bundle of said low temperature absorber and wherein said means for directing comprises a pipe through which said second solution portion flows out of said collection pan and into said pool at the bottom of said absorber.

17. The absorption chiller according to claim 4 wherein the width of said chiller, in capacities up to 800 refrigeration tons, is less than seven feet eight inches.

18. The absorption chiller according to claim 4 wherein said low temperature generator is located generally horizontally adjacent said high temperature absorber and wherein said high temperature generator is located generally horizontally adjacent said low temperature absorber.

19. The absorption chiller according to claim 4 wherein the flow of both said first solution portion from said low temperature generator to said low temperature absorber and the flow of said second solution portion from said high temperature generator to said high temperature absorber is unassisted by a pump.

20. The absorption chiller according to claim 4 wherein both said first distributor and said second distributor are drip pans, said drip pans distributing solution onto the respective absorber tube bundle they overlie without the assistance of pressure.

21. The absorption chiller according to claim 4 further comprising a shell, said absorber and said evaporator being disposed in said shell and wherein the height to width ratio of said shell is 1.5:1 or greater.

22. An absorption chiller comprising:
   a high temperature generator;
   a low temperature generator;
   a condenser;
   an evaporator;
   an absorber, said absorber including a high temperature absorber and a low temperature absorber, said low temperature absorber being disposed below both said high temperature absorber and said low temperature generator;
   a solution; and
   a solution pump, said solution pump pumping said solution from said absorber in parallel to said low temperature generator and to said high temperature generator, said solution then flowing, in parallel, from said low temperature generator and from said high temperature generator back to said high temperature absorber unmixed and unassisted by a pump.

23. The absorption chiller according to claim 22 wherein said chiller defines a flow path for a coolant, coolant proceeding through said flow path into, through and out of said low temperature absorber then into, through and out of said high temperature absorber then into, through and out of said condenser.

24. An absorption chiller through which a solution flows comprising:
    an absorber;
    an evaporator, said evaporator and said absorber being disposed in a first shell;
    a low temperature generator;
    a condenser, said low temperature generator and said condenser being disposed in a second shell; and
    a direct fired generator, said direct fired generator being disposed in a third shell, said second shell being disposed vertically above and in alignment with said third shell.

25. The absorption chiller according to claim 24 further comprising a solution pump, said solution pump pumping weak solution from a single location in said first shell, in parallel, to both said second shell and said third shell.

26. The absorption chiller according to claim 25 wherein concentrated solution is returned, in parallel, from said second shell and from said third shell to said first shell.

27. The absorption chiller according to claim 26 wherein said absorber is a vertically split absorber, the lower portion of said vertically split absorber being a low temperature absorber and the upper portion of said vertically split absorber being a high temperature absorber, said low temperature absorber receiving concentrated solution from said second shell and said high temperature absorber receiving concentrated solution from said third shell.

28. The chiller according to claim 27 wherein the flow of concentrated solution from said second shell to said low temperature absorber occurs as a result of elevation of said second shell above said low temperature absorber and wherein the flow of concentrated solution from said third shell to said high temperature absorber occurs as a result of a pressure differential between said high temperature generator and said high temperature absorber.

29. The chiller according to claim 28 wherein the concentrated solution delivered to said low temperature absorber flows therethrough and becomes a weak solution in the process of such flow and wherein concentrated solution delivered to said high temperature absorber flows therethrough and becomes a weak solution in the process of such flow, such weak solutions pooling together at the bottom of said absorber and being the source location for weak solution pumped by said solution pump.

30. The chiller according to claim 29 wherein said first shell and said second shell cooperate to define a flow path for a coolant, said coolant flow path sequentially proceeding through said low temperature absorber, said high temperature absorber and said condenser.

31. The chiller according to claim 30 further comprising a high temperature heat exchanger and a low temperature heat exchanger, the weak solution pumped by said solution pump to said low temperature generator flowing through said low temperature heat exchanger and the weak solution pumped by said pump to said high temperature generator flowing through said temperature heat exchanger, the concentrated solution flowing from said low temperature generator to said low temperature absorber flowing through said low temperature heat exchanger and the concentrated solution flowing from said high temperature generator to said high temperature absorber flowing through high temperature heat exchanger.

32. The chiller according to claim 31 wherein each of said low temperature absorber and said high temperature absorber includes a tube bundle and wherein said evaporator includes an upper tube bundle and a lower tube bundle.

33. The chiller according to claim 32 further comprising a refrigerant and a re-distribution pan disposed in said first shell, said re-distribution pan being disposed below the tube bundle of said high temperature absorber and below the upper tube bundle of said evaporator but above said tube bundle of said low temperature absorber and above the lower tube bundle of said evaporator, said re-distribution pan redistributing solution that has flowed through said tube bundle of said high temperature absorber onto to said tube bundle of said low temperature absorber and redistributing refrigerant that has flowed through said upper tube bundle of said evaporator onto said tube bundle of said lower tube bundle of said evaporator.

34. The chiller according to claim 32 further comprising a collection pan, said collection pan being disposed below the tube bundle of said high temperature absorber and above the tube bundle of said low temperature absorber, said collection pan collecting solution which has flowed through said tube bundle of said high temperature absorber for delivery to said solution pool located at the bottom of said absorber.

35. The chiller according to claim 32 further comprising a first and a second drip pan, said first drip pan being disposed above said tube bundle of said high temperature absorber and distributing the concentrated solution delivered to said high temperature absorber onto said tube bundle of said high temperature absorber, said second drip pan being disposed above said tube bundle of said low temperature absorber and distributing the concentrated solution delivered to said low temperature absorber onto said tube bundle of said low temperature absorber.

36. The chiller according to claim 27 wherein the height to width ratio of said first shell is 1.5:1 or greater in chiller capacities up to 800 refrigeration tons.

37. The absorption chiller according to claim 27 wherein the overall height and width of said chiller, in capacities up to 800 refrigeration tons is less than 101.75 inches and 92 inches respectively so that said chiller, in capacities up to and including 800 refrigeration tons can be shipped, without disassembly, in commercially available dry shipping containers.

38. A method of solution flow in an absorption chiller having an absorber, a low temperature generator and a high temperature generator comprising the steps of:
    pumping a weak solution, in parallel, from said absorber to both said low temperature generator and high temperature generator; and
    returning concentrated solution, in parallel and unmixed, from said low temperature generator and said high temperature generator to the absorber of said chiller, concentrated solution from said low temperature generator being delivered to a first portion of said absorber and concentrated solution from said high temperature generator being delivered to a second portion of said absorber, said first and said second portions of said absorber being disposed at different elevations, said second portion of said absorber being vertically elevated with respect to said first portion of said absorber.

39. The method according to claim 38 wherein said first portion of said absorber is a low temperature absorber and wherein said second portion of said absorber is a high temperature absorber, said returning step including the steps of employing gravity to cause the flow of concentrated solution from said low temperature generator to said low temperature absorber; and, employing pressure in said high temperature generator to cause the flow of concentrated solution from said high temperature generator to said high temperature absorber.

40. The method according to claim 39 comprising the further steps of flowing the solution returned from said low temperature generator to said low temperature absorber through said low temperature absorber and flowing the solution that is returned from said high temperature generator to said high temperature absorber through said high temperature absorber and collecting the solution which has flowed through said low temperature absorber and said high temperature absorber in a pool at the bottom of said absorber, said pool being the source for the weak solution that is pumped in said pumping step.

41. The method according to claim 40 wherein said pumping step includes the steps of flowing weak solution that is pumped from said absorber to said low temperature generator through a low temperature heat exchanger and flowing weak solution pumped from said absorber to said high temperature generator through a high temperature heat exchanger and wherein said returning step includes the steps of flowing the concentrated solution that is returned from said low temperature generator to said low temperature absorber through said low temperature heat exchanger and flowing said concentrated solution which flows from said high temperature generator to said high temperature absorber through said high temperature heat exchanger.

42. The method according to claim 41 wherein said chiller has a condenser and comprising the further step of flowing a coolant sequentially through said low temperature absorber, said high temperature absorber and the condenser of said absorption chiller.

43. The method according to claim 42 comprising the further steps of collecting the solution which has flowed through said high temperature absorber and re-distributing the solution collected in said collecting step for flow through said low temperature absorber.

44. The method according to claim 38 comprising the further step of disposing said low temperature generator above and in vertical alignment with said high temperature generator.

45. A method of flowing solution in an absorption chiller having an absorber, a low temperature generator and a high temperature generator comprising the steps of:

pumping weak solution in parallel to the low temperature generator and high temperature generator of said chiller;

concentrating weak solution in said low temperature generator;

concentrating weak solution in said high temperature generator;

employing gravity to cause the flow of concentrated solution from said low temperature generator to a first location in said absorber; and employing pressure in said high temperature generator to cause the flow of concentrated solution from said high temperature generator to a second location in said absorber, said second location in said absorber being vertically above said first location and said first location being generally disposed below said low temperature generator.

46. The method according to claim 45 comprising the further steps of flowing the concentrated solution delivered to said low temperature generator through said low temperature generator, said concentrated solution being weakened in the process; flowing the concentrated solution delivered to said high temperature generator through said high temperature generator, said solution being weakened in the process; and, collecting the solution that is weakened in the process of flow through said low temperature absorber and said high temperature absorber in a pool generally at the bottom of said evaporator said pool being the source of weak solution pumped in said pumping step.

47. The method according to claim 46 comprising the further step of disposing the low temperature generator of said chiller generally above and in vertical alignment with the high temperature generator of said chiller.

48. The method according to claim 47 further comprising the step of flowing coolant sequentially through said low temperature absorber, said high temperature absorber and the condenser of said chiller.

49. The method according to claim 48 comprising the further steps of flowing the weak solution pumped from said absorber to said low temperature generator through a low temperature heat exchanger; flowing said weak solution pumped from said absorber to said high temperature generator through a high temperature heat exchanger; flowing the concentrated solution that flows from said low temperature generator to said first location in said absorber through said low temperature heat exchanger; and, flowing the concentrated solution that flows from said high temperature generator to said second location in said absorber through said high temperature heat exchanger.

* * * * *